J. B. DAVIS.
QUANTITY STOP.
APPLICATION FILED JUNE 10, 1918.
1,291,774.
Patented Jan. 21, 1919.
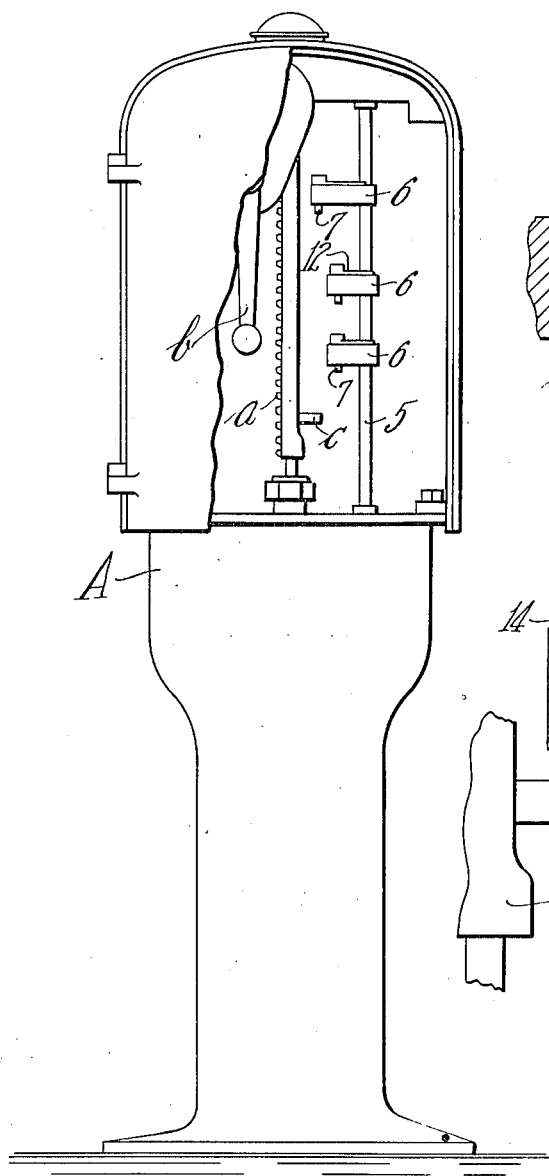
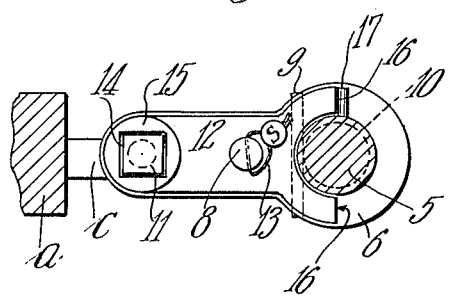
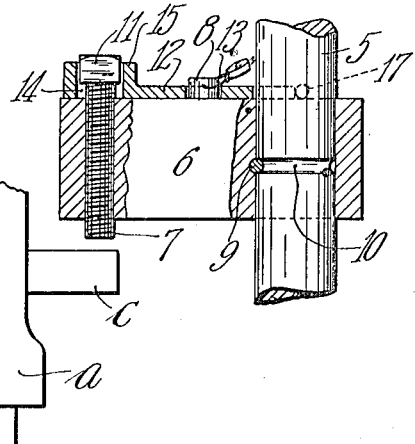
INVENTOR.
John B. Davis.
BY Chapin + Neal
ATTORNEYS.

UNITED STATES PATENT OFFICE.

JOHN B. DAVIS, OF SPRINGFIELD, MASSACHUSETTS, ASSIGNOR TO GILBERT & BARKER MANUFACTURING CO., OF WEST SPRINGFIELD, MASSACHUSETTS, A CORPORATION OF MASSACHUSETTS.

QUANTITY-STOP.

1,291,774.  Specification of Letters Patent.  Patented Jan. 21, 1919.

Application filed June 10, 1918. Serial No. 239,137.

*To all whom it may concern:*

Be it known that I, JOHN B. DAVIS, a citizen of the United States, and a resident of Springfield, in the county of Hampden and State of Massachusetts, have invented certain new and useful Improvements in Quantity-Stops, of which the following is a specification.

This invention relates to improvements in quantity stops, such for example as are employed in measuring pumps to govern the stroke thereof so that accurately measured predetermined quantities of fluid may be dispensed therefrom. More particularly, the invention relates to an improved construction of the stop itself as distinguished from the arrangement of the stops with relation to the pump for coöperative action.

An object of this invention is to provide an improved quantity stop which is arranged for convenient and accurate adjustment.

Another object of the invention is to provide in an adjustable quantity stop, simple and improved means for sealing the stop in adjusted position.

A further object of the invention is to provide a quantity stop which is characterized by extremely simple and generally improved mechanical structure.

Other objects and advantages will appear in the following description and in the appended claims.

The invention, in an embodiment at present preferred, is shown for illustrative purposes in the accompanying drawings, in which:

Figure 1 is a general elevational view of a dispensing pump and illustrates the arrangement of the quantity stops therein;

Fig. 2 is a sectional plan view drawn to an enlarged scale and illustrating the quantity stop itself; and Fig. 3 is an elevational view, partly in section, of the quantity stop.

Referring to the drawings and particularly to Fig. 1, there has been illustrated, conventionally, a well-known form of a dispensing and measuring pump A. The type of pump illustrated operates, as is quite generally understood, by means of a rack bar *a*, which is connected to the pump piston and may be reciprocated by a handle *b*, through the intermediary of suitable gearing not shown. The particular type of pump shown has been chosen merely by way of illustrating one type to which the invention may be applied and any other suitable type may be used as desired, for the invention, in the main, is independent of the kind of pump employed.

The only essentials of the pump necessary to the present invention are a movable pump operating member carrying means, as the lug *c*, which may engage a quantity stop 6 and thus limit the pump operating member to a predetermined degree of movement whereby a measured quantity of fluid may be dispensed from the pump. Since it is generally customary to have several quantity stops, as shown in Fig. 1, it is desirable to arrange them so that any one thereof may be swung into or out of the path of the lug *c*. Generally the several stops, as 6, are carried by a single rod, as 5 in Fig. 1, which rod is mounted in parallel relation with the rack bar *a*. Preferably, each stop 6 is mounted for swinging movement on rod 5 and held against axial displacement thereon, as will shortly appear. As to certain features, however, the invention is independent of the particular mounting of the stops 6 on rod 5, and accordingly, although the described mounting is preferred, the invention is not in all its aspects restricted to such mounting, and a mounting such as shown in U. S. Letters Patent No. 1,191,882 issued July 18, 1916 on an invention of Charles E. Fairbanks may equally well be employed, as well as other ways of mounting which will readily occur to those skilled in the art.

Referring now to Figs. 2 and 3; the detailed construction of one of the quantity stops 6 will be described. The stop 6 itself is merely a suitably shaped block of suitable material and may advantageously be formed by casting. Only a minimum amount of finishing operations on block 6 are necessary and such operations as are required are of an extremely simple character. Thus, it is simply necessary to drill a hole to receive the rod 5; a hole, which is later tapped, to receive a screw 7; a hole to receive a pin 9, which will be later described; and to set into the block a plain round pin 8. The block 6 may be secured to rod 5 in any suitable manner, but it is preferred to secure it by a pin 9 which passes through the block and lies tangentially to, and partially in, a circumferential groove 10 in rod 5. Such mounting permits swinging movement of the block about rod 5 as an axis and also prevents relative axial displacement of the block and rod. The rod 5 itself is merely a plain round rod which may readily and inexpensively be formed by turning.

The grooves 10 are formed in rod 5 at predetermined points, so located that, when the stop 6 is applied thereto as described, the lug $c$ will abut the under face of the stop at approximately the time that the pump has delivered the desired quantity. In order that the rack bar $a$ may be stopped exactly at the time when the pump has delivered the desired quantity, an adjustment is provided which consists of the screw 7 already described. The lower end of screw 7 is adapted to be engaged by lug $c$ and the upper end is so formed, as with a polygonal head 11, that it may conveniently be turned to effect the desired adjustment.

Although the adjustment, such as just described, is essential in a quantity stop, the provision of the adjustment makes it necessary (at least in some localities) or at any rate desirable that the adjustment be sealable. The provision of a simple and relatively inexpensive means for sealing the screw 7 constitutes one of the main features of the present invention and will now be described. A plate 12, preferably substantially of the size and shape of the outstanding portion of block 6, is laid upon the top of the block and a suitable opening is provided in the plate to receive the pin 8. The latter projects from the block a distance slightly greater than the thickness of plate 12 and has a small lateral hole therein through which a wire 13 may be passed. The ends of wire 13 may then be brought together and held by a seal S so that plate 12 cannot be removed without breaking the wire or the seal. The pin 8 may, if desired, be omitted for obviously the sealing wire 13 may be wrapped around the plate 12 and block 6 to bind the two together. The plate 12 also has an opening 14 therein to receive the head 11 of screw 7 and prevent rotation thereof. Preferably such opening is formed in an upstanding boss 15 on plate 12 so that the screw 7 may be moved up or down throughout a considerable range and still remain so positioned that its head 11 will be engaged by the walls of opening 14. Thus the adjusting screw may be effectively sealed by means which are not only simple, but also convenient to apply.

According to another feature of the invention, the plate 12 is made to perform an additional function in the event that the stops 6 are to be swingable on, rather than fixed to, the rod 5. The plate 12 is so made as to partially encompass the rod 5, leaving two ends 16 either one of which may on a swinging movement of the stop 6 engage with a pin 17 which protrudes radially outward from rod 5 and closely adjacent the top of stop 6. Thus the extent of swinging movement of the stop may be limited and also the engagement of pin 17 with one of the ends 16 insures, as indicated in Fig. 2, that the screw 7 may be accurately positioned in the path of the lug $c$. The pin 17 obviously assists in preventing axial displacement of the block 6 on rod 5, at least in the direction in which such displacement is liable to occur under repeated blows of lug $c$. Furthermore, the arrangement whereby the plate 12 partially encompasses rod 5 assists pin 8 in preventing lateral displacement of plate 12 on block 6, so that it will be obvious that plate 12 need not necessarily entirely encompass the head 11 of screw 7, although such arrangement is preferred.

Thus, an improved quantity stop has been provided which is characterized by simplicity and relatively low cost of manufacture and which may be accurately adjusted and conveniently and effectively sealed.

It is recognized that various modifications may be made in the structure herein disclosed for illustrative purposes without departing from the scope of the invention which is defined by the appended claims rather than by the foregoing description.

What I claim is—

1. In combination, a reciprocable pump operating means having a projection thereon, a rod mounted in parallel relation to said means, an arm carried by said rod and adapted to be swung into and out of the path of said projection to limit the stroke of said means, a rotatable adjusting device provided with a flat surface parallel with its axis of rotation, and a member separable from the arm in the direction of said axis and having at one end a flat surface to engage the first-named surface and prevent rotation of said device and at the other end with a rounded recess to partially encompass said rod, said member being sealable to the arm to prevent separation of the former from the latter.

2. In combination, a reciprocable pump operating means having a projection thereon, a rod mounted in parallel relation to said means, a stop swingingly mounted on said rod, and adapted to be swung into and out of the path of said projection to limit the stroke of said means, a rotatable adjusting device carried by said stop and having a flat surface parallel with its axis of rotation, a member separable from the stop in the direction of said axis and having a part to engage said surface and prevent rotation of said device, said stop and member arranged to be sealed together to prevent separation in said direction, said member arranged to partially encompass said rod leaving two spaced ends, and a projection on said rod in the path of said ends to limit the swinging movement of said stop.

3. In combination, a reciprocable pump operating means having a projection thereon, a rod mounted in parallel relation to said means, an arm carried by said rod and adapted to be swung into and out of the path of said projection to limit the stroke of said means, a rotatable adjusting device carried by said arm and having a polygonal head, a member separable from said arm in the direction of the axis of said device and constructed to fit between said head and rod, said member being formed at one end to engage said head and prevent rotation thereof, and at the other end with a rounded recess to partially encompass said rod, whereby said member is held from lateral and longitudinal displacement on said arm, said member being sealable to the latter to prevent displacement from the arm in the direction of said axis.

4. In combination, a supporting rod, an arm swingingly mounted thereon, a screw passing through said arm in parallel relation with said rod and projecting beyond one face thereof, a flat surface formed on the projecting portion of the screw and parallel with its axis, a projection provided in said face of the arm, a member engaging said face and arranged to partially surround said rod leaving two spaced ends, an opening in said member through and beyond which said projection extends, a lateral opening in said projection beyond said member to permit said arm and member to be fastened together, said member having a part to engage said flat surface and prevent rotation of the screw, and a projection from said rod movable between said ends and adapted to engage therewith to limit the swinging movement of the arm.

JOHN B. DAVIS.